(12) United States Patent
Bothe, Jr.

(10) Patent No.: US 7,576,640 B2
(45) Date of Patent: Aug. 18, 2009

(54) METHOD AND APPARATUS FOR DETECTING USE OF A SPARE WHEEL

(75) Inventor: Steven Paul Bothe, Jr., Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 329 days.

(21) Appl. No.: 11/598,863

(22) Filed: Nov. 14, 2006

(65) Prior Publication Data

US 2008/0111671 A1     May 15, 2008

(51) Int. Cl.
    *B60Q 1/00*     (2006.01)
(52) U.S. Cl. ............... 340/438; 340/425.5; 340/444
(58) Field of Classification Search ........... 340/438, 340/425.5, 442, 445, 447, 444, 443; 73/146.2, 73/146
    See application file for complete search history.

(56) References Cited

U.S. PATENT DOCUMENTS

| | | | | |
|---|---|---|---|---|
| 5,463,374 | A * | 10/1995 | Mendez et al. ............. | 340/442 |
| 5,546,311 | A * | 8/1996 | Sekine ....................... | 701/208 |
| 6,362,731 | B1 * | 3/2002 | Lill ............................ | 340/445 |
| 6,463,798 | B2 * | 10/2002 | Niekerk et al. ............ | 73/146.2 |
| 6,917,050 | B2 * | 7/2005 | Lin ........................... | 250/559.22 |
| 7,030,745 | B2 * | 4/2006 | Utter et al. ................. | 340/447 |
| 7,202,777 | B2 * | 4/2007 | Tsuji et al. ................. | 340/445 |

* cited by examiner

*Primary Examiner*—Benjamin C Lee
*Assistant Examiner*—Daniel Previl
(74) *Attorney, Agent, or Firm*—Young Basile

(57) ABSTRACT

An apparatus and method is provided for detecting when a spare wheel has been placed onto a rolling wheel location and for taking appropriate action such as providing a driver alert, limiting vehicle speed or alerting the driver when vehicle speed exceeds the maximum safe speed for operation with a spare wheel. The spare wheel transmits a signal with a protocol compatible marker. The vehicle receives the protocol compatible marker. The marker is compared to a predetermined value to determine that the protocol compatible marker signal is indicative of a spare wheel.

21 Claims, 3 Drawing Sheets

METHOD AND APPARATUS FOR DETECTING USE OF A SPARE WHEEL

TECHNICAL FIELD

The present invention relates to the field of monitoring the condition of tires and wheels on motor vehicles and more particularly to detecting when a spare wheel is in use as a rolling wheel of a vehicle.

BACKGROUND

Wheels for motor vehicles are equipped with transmitters that broadcast information about the status of the wheels, including the tire identity and location, whether the wheel is rolling or stationary, temperature and tire pressure. Vehicles on which such wheels are mounted include tire monitoring systems that receive and process the information transmitted by the wheels. Information is exchanged between wheels and vehicles by means of wireless transmissions in accordance with communication protocols.

It has been proposed to use tire monitoring systems to detect when a spare wheel has been mounted as an active or rolling wheel. See, for example, U.S. Pat. No. 7,030,745. Such systems rely on the use of a unique wheel identification number. When a spare wheel is removed from a storage location and installed as a rolling wheel (such as to fix a flat tire), the system detects rolling movement in the spare wheel (which is uniquely identified by its ID number). Thus it is determined that the spare wheel has been placed onto a rolling wheel location.

A drawback to these proposed systems is that they rely on an association of a unique ID number with a specific wheel and wheel position. This association of unique ID numbers with wheel positions takes place during a learning mode, which may require manual intervention or additional electronics.

SUMMARY

It would be desirable to detect the use of a spare wheel on a rolling wheel without requiring that spare wheel have a unique ID number that is known in advance by the tire monitoring system.

In accordance with one aspect of the invention, a method is provided for determining when a spare wheel equipped with a transmitter is in use on a rolling wheel location of a vehicle. The method includes transmitting from the spare wheel a protocol compatible marker signal; receiving on the vehicle the protocol compatible marker signal; and comparing the protocol compatible marker signal to a predetermined data to determine that the protocol compatible marker signal is indicative of a spare wheel. The predetermined data is not previously associated with the spare wheel.

In accordance with another aspect of the invention, an apparatus is provided for determining when a spare wheel equipped with a transmitter is in use on a vehicle having a plurality of rolling wheel locations. The apparatus includes a receiver mounted to vehicle and adapted to receive a signal from the transmitter on the spare wheel; a memory storing at least one predetermined protocol compatible marker value indicative of a spare wheel; and a controller coupled to the receiver and the memory. The controller is programmed to generate a spare-tire-in-use-signal if the signal received from the transmitter corresponds to the predetermined protocol compatible marker value stored in memory. The value stored in memory is not previously associated with the spare wheel.

In accordance with yet another aspect of the invention, an apparatus is provided for determining when a spare wheel equipped with a transmitter is in use on a rolling wheel location of a vehicle. The apparatus includes a spare wheel having a first memory that contains a protocol compatible marker, and a transmitter that transmits the protocol compatible marker stored in the first memory. The apparatus also includes a receiver mounted to vehicle and adapted to receive the protocol compatible marker transmitted from the spare wheel; a second memory storing at least one predetermined value not previously associated with the spare wheel; and a controller coupled to the receiver and the memory and configured to generate a spare-tire-in-use-signal if the protocol compatible marker transmitted from the spare wheel corresponds to the predetermined data stored in the second memory.

BRIEF DESCRIPTION OF THE DRAWINGS

The description herein makes reference to the accompanying drawings wherein like reference numerals refer to like parts throughout the several views, and wherein.

DETAILED DESCRIPTION OF THE EMBODIMENTS

Figure 1:
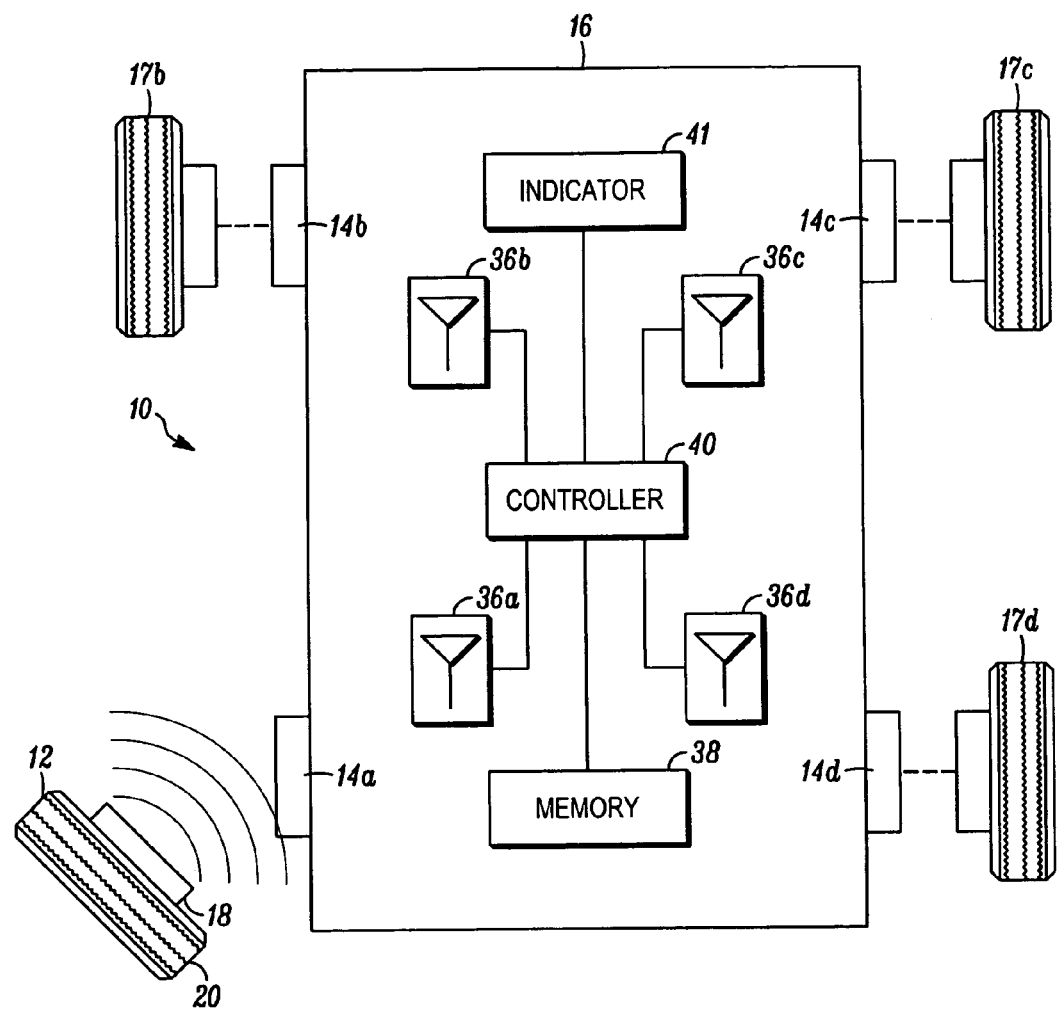
FIG. 1 is a block diagram of a system for remotely operating a vehicle in accordance with a first embodiment of the invention.

Referring to FIG. 1, a tire monitoring system 10 is illustrated to detect the use of a spare wheel 12 on one of rolling wheel locations 14*a*-14*d* of a vehicle 16. Normally spare wheel 12 is stowed on vehicle 16 in a suitable location, such as the vehicle's trunk (not shown). However, should one of the regular wheels (such as wheels 17*b*-17*d*) on rolling wheel locations 14*a*-14*d* become disabled (e.g., a flat tire), then the operator of vehicle 16 can replace the disabled wheel at one of rolling wheel locations 14*a*-14*d* with spare wheel 12. It would be useful to detect the use of spare wheel 12 on one of rolling wheel locations 14*a*-14*d*.

As explained below, system 10 allows detection of the use of spare wheel 12 as rolling wheel without requiring that spare wheel have a unique ID number that is known in advance by system 10.

Figure 2:
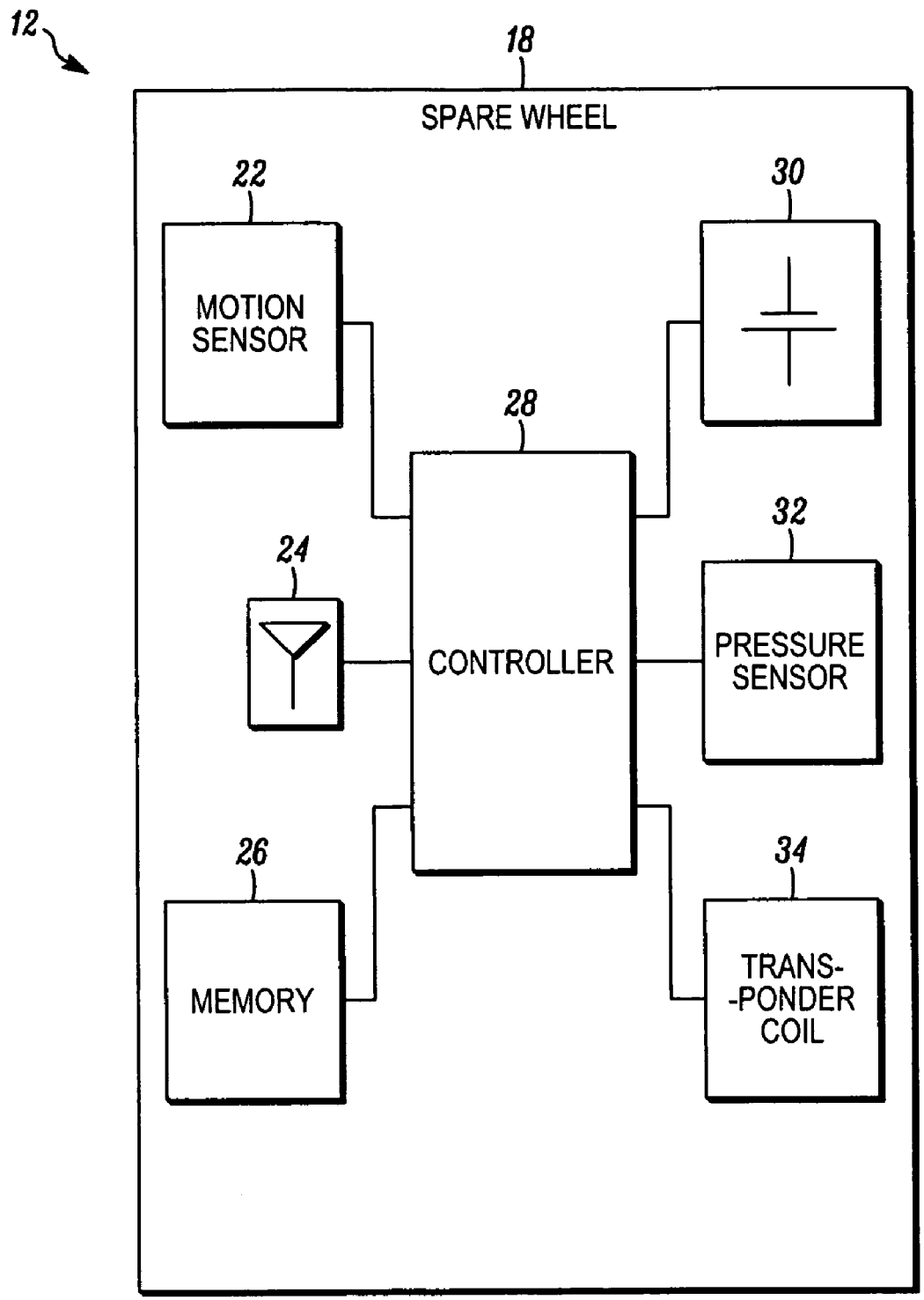
FIG. 2 is a block diagram of the spare wheel shown in FIG. 1.

Referring to FIGS. 1 and 2, system 10 includes components on both spare wheel 12 and vehicle 16. Spare wheel 12 includes a wheel portion 18 and a tire 20. As shown schematically in FIG. 2, mounted to wheel portion 18 are a motion sensor 22, a transmitter 24, a memory 26, a controller 28 coupled to memory 26, motion sensor 22 and transmitter 24, and a battery 30 to provide power to the electronic components. Transmitter 24 can be a transceiver if two-way communication is desired between spare wheel 12 and vehicle 16. Controller 28 can be a programmed microcontroller or an application-specific integrated circuit (ASIC) and can be integrated with memory 26 one or more of the other components of system 10. Spare wheel 12 is also equipped with a pressure sensor 32 operatively coupled to the interior of tire 20, and a transponder activation coil 34.

Controller 28 receives input from motion sensor 22 and pressure sensor 32 and formats this input for wireless transmission by transmitter 24 to vehicle 16 as a signal in accordance with a predetermined communications protocol. Communication by controller 28 can be at predetermined intervals or can be initiated in response to stimulation of transponder activation coil 34 by a signal emanating from vehicle 16. As explained below, controller 28 also formats a protocol compatible marker signal for transmission by transmitter 24.

Referring to FIG. 1, vehicle 16 includes receivers 36a-36d mounted thereon. Receivers 36a-36d are adapted to receive signals transmitted by transmitter 24. Receivers 36a-36d can be transceivers if two-way communication is desired between spare wheel 12 and vehicle 16. Alternatively, a single receiver such as receiver 36a, for example, can be used to cover all rolling wheel locations 14a-14d. Vehicle 16 also includes a memory 38 and a controller 40. Using memory 38, controller 40 processes information contained in the signals received by receiver 36a, for example, to determine if spare wheel 12 is in use at one of rolling location 14a, for example. Vehicle can be equipped with one receiver such as receiver 36a or it can have multiple receivers or antennae located near each rolling wheel position, such receivers 36b-36d. Receiver 36 and controller 40 can be part of an existing tire pressure management system ("TPMS") programmed in accordance with the disclosed embodiments to recognize use of spare wheel 12 in one of moving wheel locations 14a-14d.

Controller 40 is also coupled to an indicator 41 located on or near the vehicle dashboard (not shown). When controller 40 determines that spare wheel 12 is in use at a one of rolling wheel locations, it generates a spare-wheel-in-use signal that causes indicator 41 to provide visual indication to the operator of vehicle 16. Alternatively, indicator 41 can provide audio or tactile indications to the operator.

System 10 can also take appropriate safety actions when spare wheel 12 is in use at one of rolling locations 14a-14d. For example, system 10 can provide, as discussed previously, a driver alert such as indicator 41. System 10 can also limit the speed of vehicle 16 when it exceeds the maximum safe speed for operation with spare wheel 12. Alternatively, system 10 can alert the driver when the speed of vehicle 16 exceeds the maximum safe speed for operation with spare wheel 12.

Figure 3:
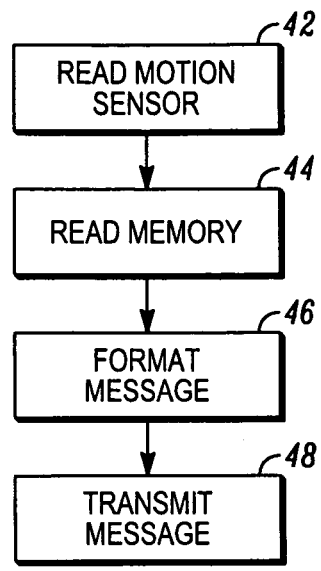
FIG. 3 is a flow chart illustrating the operation of the spare wheel shown in FIG. 1.
Figure 4:
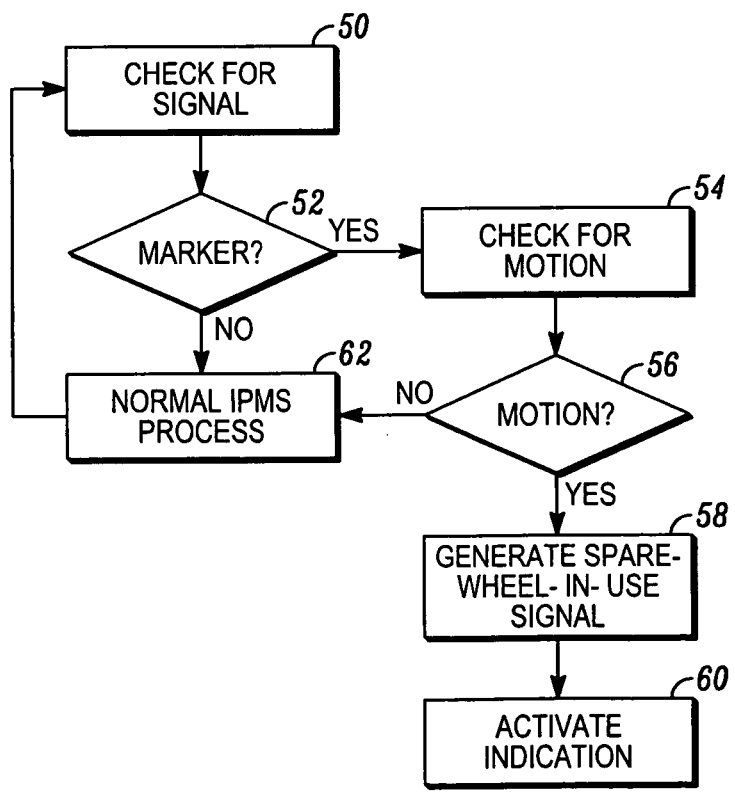
FIG. 4 is a flow chart illustrating the operation of the vehicle shown in FIG. 1.

The operation of spare wheel 12 and vehicle 16 is illustrated by the flow charts of FIG. 3 and FIG. 4, respectively. Referring to FIG. 3, beginning at block 42, controller 28 reads motion sensor 22 to acquire data indicating whether spare wheel 12 is in motion. At block 44, controller 28 reads memory 26 to acquire data used to generate a signal that includes a marker indicative of a spare wheel. At block 46, processor formats a signal or sequence of signals for transmission using the data acquired from motion sensor 22 and memory 26 to include a protocol compatible or generic marker indicative of a spare tire. At block 48, controller 28 transmits the formatted signal to vehicle 16 via transmitter 24.

Signals or messages transmitted by wheel 12 to vehicle 16 are formatted in accordance with a predetermined communications protocol. The protocol can be a recognized standard or a proprietary or application specific protocol. Under such protocols, signals generated by wheel 12 will have a predetermined syntax, format and/or structure and will include predetermined types of content. The applicable protocol can also specify the sequence with which certain types of signals are sent. For example, the protocol could include signals with the following format:

[Function code {3 Bits}] [ID {24 Bits}] [Press Data {8 Bits}] [Check Sum {2 Bits}]

A signal can be created to include a marker that is generically indicative of a spare wheel but that is not uniquely associated with a specific wheel such as wheel 12. This signal can be formatted in a manner that can deviate from but is still compatible with the applicable protocol or other protocol used to send and receive messages between wheel 12 and vehicle 16. In stating that the signal is compatible with a protocol, it is meant that the signal can be processed by equipment programmed to communicate in accordance with the protocol. By maintaining compatibility with the applicable protocol, for example, the marker signal can be used without having to reprogram or replace existing TPMS hardware. Within a protocol-compatible signal, a marker indicative of a spare wheel may take many forms. For example, function codes can be drawn from a predetermined list and tire ID numbers can be drawn from a predetermined range. The protocol compatible marker indicative of a spare wheel can be use of a special function code (e.g. "000") that is not already assigned under the applicable protocol. Alternatively, the marker can be a tire ID number outside of the predetermined range (e.g. "999999"). Alternatively, the marker can be the transmission of signals in a predetermined sequence not otherwise used under the protocol. Alternatively, the marker could use a value for pressure outside of the recognized ranges.

The marker can be transmitted using the data structure normally used or using a data structure that included an additional field to indicate whether the wheel was a spare wheel or a regular wheel, such as:

[Position Code {>=1 Bit}] +"[Function code {3 Bits}] [ID {24 Bits}] [Press Data {8 Bits}][Check Sum {2 Bits}]"

In the foregoing example, the gods for wheels could be selected as shown in Table 1 below:

TABLE 1

| One bit coding | Two bit coding |
| --- | --- |
| 0 = Road tire | 00 = Road 1 |
| 1 = spare tire | 01 = Road 2 |
|  | 10 = Spare Full Service |
|  | 11 = Spare Temp Service |

Note that by using a two bit coding scheme, information pertaining to a spare wheel can indicate whether it is a full service or temporary spare.

Referring to FIG. 4, the operation of vehicle 16 is illustrated. At block 50, controller 40 checks receivers 36a-36d for a signal from wheels associated with vehicle, such as spare wheel 12 or wheels 17b- 17d. This can be implemented by having controller 40 wait for a signal to be received by receiver 36a-d. Alternatively, controller can periodically transmit a request to wheels such as spare wheel 12 or wheels 17b-17d as explained above. Such a request causes transponder coil 34 to activate transmission of data by wheel 12, for example. When a signal is received, controller 40 determines at block 52 whether the signal contains a protocol-compatible marker indicative of a spare wheel such as spare wheel 12. Controller 40 can accomplish this step by comparing the contents of the signal received with information in memory 38.

The implementation of this step depends on the type of marker used to indicate a spare wheel. For example, if the marker is a special function code (e.g. "000") stored in memory 38, then controller 40 would compare the function code in the signal received by receivers 36a-36d to the special function code stored in memory 38 to determine if the function code in the signal corresponded to the special function code in memory 38. Alternatively, if the marker is a specific sequence of function codes stored in memory 38, then controller 40 would record in memory 38 the sequence of functions in the signals received by receiver 36*a-d*. Controller 40 would then compare the sequence of function codes in the signals to the specific sequence of function codes stored in memory 38 to determine if the sequence of function codes in the signals received by receivers 36*a*-36*d* corresponded to the marker. Alternatively, if the marker is a predetermined tire ID number (e.g. "999999") stored in memory 38, then controller 40 would compare the function code in the signal received by receivers 36*a*-36*d* to the predetermined tire ID number stored in memory 38 to determine if the tire ID number in the signal corresponds to the predetermined tire ID code in memory.

It should be noted that to detect the presence of spare wheel 12 in accordance with the disclosed embodiment, vehicle 16 need not store in memory 38 data specific to spare wheel 12 (such as a unique tire ID number corresponding to spare wheel 12). Rather, vehicle 16 need only store data about a marker that generically indicates a spare wheel such as spare wheel 12. Thus, any spare wheel installed in one of running wheel locations 14*a*-14*d* can be identified as a spare wheel, even if no information about that particular spare wheel is recorded in vehicle 16.

If at decision block 52, controller 40 determines that a marker is present in the signal received by receivers 36*a-d*, then it is judged that the sender of the signal is a spare wheel such as spare wheel 12. Control then moves to block 54, where controller 40 checks the signal to determine if it contains data indicating that the wheel sending the signal is in motion. To avoid false positives (that is false indications of a spare wheel in use), controller 54 can postpone determination that spare wheel 12 is in motion until signals indicating motion have been received for a minimum period of time and/or controller 16 determines that vehicle 16 is also moving.

At decision block 56, if controller 40 determines that spare wheel 12 is in motion, then it is judged that spare wheel 12 is in use on one of moving wheel locations 14*a*-14*d*. In that case, control moves to block 58 where controller 40 generates a spare-wheel-in-use signal. Control then moves to block 60, where indicator 42 is activated in response to the spare-wheel-in-use signal.

At decision block 56, if controller 40 determines that spare wheel 12 is not in motion, then it is judged that spare wheel 12 is not in use and control moves block 62 where controller continues with its normal TPMS processing, and then returns to block 50 to continue monitoring for incoming signals from wheels such as spare wheel 12 and wheels 17*b*-17*d*.

The above-described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A method of determining when a spare wheel equipped with a transmitter is in use on a rolling wheel location of a vehicle, comprising:
   transmitting from the spare wheel a protocol compatible marker;
   receiving on the vehicle the protocol compatible marker; and
   comparing the protocol compatible marker to a predetermined data not uniquely associated with the spare wheel, to determine that the protocol compatible marker is indicative of a spare wheel.

2. The method of claim 1, wherein the protocol compatible marker is a predetermined function code.

3. The method of claim 1, wherein the protocol compatible marker is a predetermined tire ID code.

4. The method of claim 1, wherein the protocol compatible marker is a predetermined sequence of signals.

5. The method of claim 1, further comprising:
   detecting motion in the spare wheel;
   transmitting from the spare wheel motion data indicative of detected motion of the spare wheel; and
   receiving the motion data;
   wherein comparing the protocol compatible marker takes place only when the motion data indicates that the spare wheel is in motion.

6. The method of claim 1, further comprising:
   detecting motion in the spare wheel;
   wherein transmitting from the spare wheel a protocol compatible marker takes place only when motion of the spare wheel is detected.

7. The apparatus of claim 1, wherein the protocol compatible marker is a field whose value is indicative of one of a spare wheel and a regular wheel.

8. The method of claim 1, further comprising;
   limiting the speed of the vehicle when the vehicle exceeds a maximum safe speed.

9. The method of claim 1, further comprising;
   alerting an operator of the vehicle that the vehicle exceeds a maximum safe speed.

10. An apparatus for determining when a spare wheel equipped with a transmitter is in use on a vehicle having a plurality of rolling wheel locations, comprising:
    a receiver mounted to the vehicle and adapted to receive a signal from the transmitter on the spare wheel;
    a memory storing at least one predetermined protocol compatible marker indicative of a spare wheel; and
    a controller coupled to the receiver and the memory and configured to generate a spare-tire-in-use-signal if the signal received from the transmitter corresponds to the predetermined protocol compatible marker stored in the memory; wherein the marker stored in the memory is not previously associated with the spare wheel.

11. The apparatus of claim 10, wherein the protocol compatible marker is a predetermined function code.

12. The apparatus of claim 10, wherein the protocol compatible marker is a predetermined tire ID code.

13. The apparatus of claim 10, wherein the protocol compatible marker is a predetermined sequence of signals.

14. The apparatus of claim 10, wherein the receiver is mounted on the vehicle in proximity to at least one of the rolling wheel locations.

15. An apparatus for determining when a spare wheel equipped with a transmitter is in use on a rolling wheel location of a vehicle, comprising:
    a spare wheel having mounted thereon a first memory containing a marker and a transmitter adapted to transmit the marker;
    a receiver mounted to vehicle and adapted to receive the marker transmitted from the spare wheel;

a second memory storing at least one predetermined value not previously associated with the spare wheel; and a controller coupled to the receiver and the second memory and configured to generate a spare-tire-in-use-signal if the marker transmitted from the spare wheel corresponds to the predetermined data stored in the second memory.

16. The apparatus of claim 15, further comprising a sensor to detect motion of the spare wheel; wherein the transmitter is responsive to the sensor to transmit a motion signal indicative of whether the spare wheel is in motion; and the controller is responsive to the motion signal to generate the spare-tire-in-use signal if the spare wheel is in motion and the signal received from the transmitter corresponds to the predetermined data stored in the second memory.

17. The apparatus of claim 15, further comprising a sensor to detect motion of the spare wheel; wherein the transmitter is responsive to the sensor to transmit the signal only when spare wheel is in motion.

18. The apparatus of claim 15, wherein the data stored in the second memory is a predetermined function code.

19. The apparatus of claim 15, wherein the data stored in the second memory is predetermined tire ID code.

20. The apparatus of claim 15, wherein the data stored in the second memory is a predetermined sequence of signals.

21. The apparatus of claim 15, further comprising a indicator responsive to the spare-tire-in-use signal to alert an operator of the vehicle that the spare wheel is in use.

* * * * *